J. L. WOODBRIDGE.
SYSTEM OF ELECTRICAL DISTRIBUTION.
APPLICATION FILED MAY 27, 1911.
1,084,722.
Patented Jan. 20, 1914.
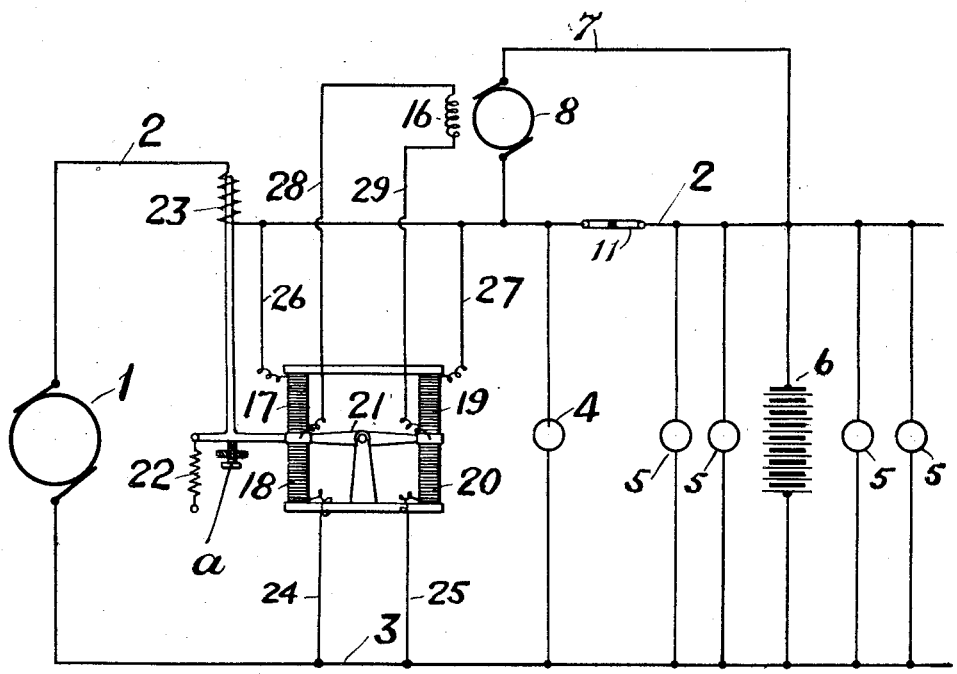
WITNESSES:
INVENTOR
Joseph L. Woodbridge
BY
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,084,722.      Specification of Letters Patent.      Patented Jan. 20, 1914.

Original application filed April 19, 1904, Serial No. 203,837. Divided and this application filed May 27, 1911. Serial No. 629,925.

*To all whom it may concern:*

Be it known that I, JOSEPH LESTER WOODBRIDGE, a citizen of the United States, residing at Philadelphia, in the county of Philadelphia and State of Pennsylvania, have invented a certain new and useful System of Electrical Distribution, of which the following is a specification.

The invention has relation to a system of electrical distribution in which there is employed what is called a floating battery, that is to say, a battery arranged across the line, which may be located at a considerable distance from the power house; and its object is to enable such a line battery to do more or less regulation of the station load, even when fluctuations are caused by load near the generator and remote from the battery.

To this and other ends hereinafter set forth the invention comprises the improvements to be presently described and finally claimed.

The nature, characteristic features and scope of the invention will be more fully understood from the following description taken in connection with the accompanying drawing in which—

1 is the station generator or generators.

2 and 3 are the line conductors.

4 and 5 indicate translating devices, which constitute the load.

6 is a storage battery connected across the conductors 2 and 3 and located, for example, at a point remote from the generator 1, as for instance, at or near the end of a trolley line.

7 is a feeder connected with the battery 6 and boosted as by a suitably driven booster, whose armature is shown at 8.

The conductor 2 may be interrupted out on the line, for example, by opening the switch 11.

The booster 8 is provided with a field winding 16 and the current through it is controlled or even reversed to effect the mode of operation described below. This control is effected by the carbon regulator shown on the drawing, in which 17, 18, 19 and 20 indicate piles or groups of carbon or other material whose electrical resistance is responsive to changes in pressure.

21, is an insulated centrally pivoted lever adapted when turned, to change the pressure upon the various members of the groups. This lever is counter-balanced as by a spring or weight 22 and is connected with a solenoid 23, whose coil is interposed in the conductor 2. The ends of the respective groups are connected with the leads 2 and 3 as by the conductors 24, 25, 26 and 27. The central portions of the groups are connected as by conductors 28 and 29 with the booster field coil 16 so that if the pressure on all of the groups is equal no current traverses the coil 16.

a, is an adjustable back stop for relieving the pressure produced by the spring 22 upon the carbons. Under normal conditions the pressure on the carbons is so adjusted by means of the back stop a, that current passing through the coil 16, by way of 27, 19, 29, 28, 18, 24 is sufficient to excite the booster in such a way that it sends the proper amount of current through 7 to the battery. Under these conditions the carbon piles 18 and 19 are under pressure and as the load increases on the generator the solenoid 23 exerts an increasing force tending to overcome the tension of the spring 22 and at a predetermined load this pull is sufficient to relieve the pressure of the lever 21 upon the stop a. Should the load increase beyond this predetermined amount, additional pressure will be exerted upon the groups 17 and 20, whereby their resistance will be diminished in comparison with the groups 18 and 19, which are relieved from pressure. As a result of this, the current through 16 is reduced thus causing the booster to send less current by way of feeder 7 to the battery, thereby relieving the generator of load and if the load on the generator continues to increase sufficiently the first effect will be to equalize the pressure on the groups and thus reduce the current in 16 to zero and the second effect will be to decrease resistance of 17 and 20 and increase the resistance of 18 and 19, thereby sending current in reverse direction through 16 by way of 26, 17, 28, 29, 20 and 25, thereby actually causing the booster to assist the battery to discharge by way of the feeder thus actually supplying current near the station to relieve the overload.

From the foregoing description, it is apparent that the effect produced is to relieve the generator of a portion or all of the fluctuations of load above a predetermined maximum, at the same time permitting the battery to be located on a line at a distance from the generator. Otherwise stated, the effect is to enable a line battery to do more or less regulation of the station load, even when fluctuations are caused by loads near the station and remote from the battery, which latter may additionally perform the functions of a floating battery. When the load on the generator is less than the predetermined amount, for which the spring 22 is adjusted, the lever of the regulator will rest against the back stop $a$, and the regulator will not respond to changes of load in the coil 23. When the current in the coil 23 exceeds this predetermined amount, the regulator will be responsive to fluctuations in this load, and will control the booster 8 to relieve the generator of said fluctuations or a substantial proportion of them.

It may be remarked that normally the generator voltage exceeds the battery voltage by the amount of drop in the conductor 2 due to its length, so that current flows from the generator to the battery by conductor 2, as well as by conductor 7. The switch 11 may, therefore, be either opened or closed. As a matter of fact it is normally closed so as to use the conductor 2 for transmitting a part of the average load.

It will be obvious to those skilled in the art to which my invention relates that modification may be made in detail without departing from the spirit thereof, hence I do not limit myself to the described mode of procedure.

This application is a division of my application Serial No. 203,837, filed April 19th, 1904. Patent 1,051,940 of February 4th, 1913. In that application I have claimed certain features of the invention broadly. In this application, therefore, I desire to claim and secure by Letters Patent the following:

1. In combination, a generating source and its load circuit, a storage apparatus in operative relation thereto, a regulator adapted to control the division of load between the source and the battery and a stop for the regulator adapted to prevent it from acting when the load on the source is below a predetermined value.

2. In combination, a generating source and its load circuit, a storage apparatus in operative relation thereto, a regulator adapted to control the division of load between the source and the storage apparatus and an adjustable stop for the regulator adapted to prevent it from acting when the load on the source is below a predetermined value.

3. In combination, a consumption circuit, two sources of electro-motive force connected thereto, means including a regulator for controlling the division of load between the two sources, an exciting coil for said regulator responsive to load on one of the sources and adapted to control the regulator to transfer load from said source to the other source in amounts varying with the current in said coil, and a stop for the regulator adapted to prevent it from acting when the current in the coil is less than a predetermined amount.

4. In combination, a consumption circuit, two sources of electro-motive force connected thereto, means including a regulator for controlling the division of load between the two sources, an exciting coil for said regulator responsive to load on one of the sources and adapted to control the regulator to transfer load from said source to the other source in amounts varying with the current in said coil, and a stop adapted to prevent variations of said current from producing any effect on the regulator until said current exceeds a predetermined value.

In testimony whereof I have hereunto signed my name.

JOSEPH LESTER WOODBRIDGE.

Witnesses:
 J. H. TRACY,
 R. A. WHETSTONE, Jr.